(12) United States Patent
Olson et al.

(10) Patent No.: US 8,378,846 B2
(45) Date of Patent: Feb. 19, 2013

(54) MOBILE NETWORK BACK-UP FOR FIXED METER READING NETWORKS

(75) Inventors: John A. Olson, Brookfield, WI (US); Kelly Laughlin-Parker, Waukesha, WI (US); Mark Lazar, New Berlin, WI (US); Michele R. B. Malinowski, Hartford, WI (US); Jeffrey Schreiner, Milwaukee, WI (US)

(73) Assignee: Badger Meter, Inc., Milwaukee, WI (US)

( * ) Notice: Subject to any disclaimer, the term of this patent is extended or adjusted under 35 U.S.C. 154(b) by 278 days.

(21) Appl. No.: 12/848,304

(22) Filed: Aug. 2, 2010

(65) Prior Publication Data
US 2011/0140910 A1  Jun. 16, 2011

Related U.S. Application Data

(63) Continuation-in-part of application No. 12/635,079, filed on Dec. 10, 2009, now abandoned.

(51) Int. Cl.
*G08B 23/00* (2006.01)

(52) U.S. Cl. ............... 340/870.02; 370/310; 370/509; 370/530

(58) Field of Classification Search ........... 340/870.02; 370/310, 509, 350
See application file for complete search history.

(56) References Cited

U.S. PATENT DOCUMENTS

| 2005/0195775 A1 | 9/2005 | Petite et al. |
| 2005/0237959 A1 | 10/2005 | Osterloh et al. |
| 2010/0007521 A1 | 1/2010 | Cornwall |
| 2010/0026517 A1 | 2/2010 | Cumeralto et al. |

FOREIGN PATENT DOCUMENTS

WO  2008/086231 A3  7/2008

*Primary Examiner* — Arnold Kinkead
(74) *Attorney, Agent, or Firm* — Boyle Fredrickson, S.C.

(57) ABSTRACT

A method and apparatus is disclosed for providing a metering site transceiver (12 or 15) with the ability to operate in a mobile back-up network (26) to signal utility consumption data that would otherwise be transmitted to a fixed receiver (30) in a fixed network AMR system. A mobile collection back-up capability allows a vehicle collection system (26, 27) to be used to read the remote meters (11, 14) in the fixed network, when a gateway (30) is detected as not communicating with the site transceiver (12 or 15).

18 Claims, 4 Drawing Sheets

MOBILE NETWORK BACK-UP FOR FIXED METER READING NETWORKS

CROSS REFERENCE TO RELATED APPLICATIONS

This is a continuation-in-part of U.S. patent application Ser. No. 12/635,079, filed Dec. 10, 2009, now abandoned and the benefit of its earlier filing date is claimed herein. This application also incorporates subject matter from U.S. patent application Ser. No. 12/792,128, filed Jun. 2, 2010 and the benefit of its earlier filing date is claimed herein.

TECHNICAL FIELD

This invention relates to automatic meter reading systems, including "AMR" and "AMI" systems, and in particular to utility meters using apparatus for transmitting metering data signals to a fixed or mobile radio receiver in a wireless network for collecting utility metering data.

DESCRIPTION OF THE BACKGROUND ART

A typical fixed network meter reading system comprises metering sites, gateways, and a backhaul network. The metering sites include radio frequency transmitters or transceivers located at utility meter sites, which are contemplated as including either a water meter or a gas meter, or both. Typically, these utility meters are not connected to a source of AC power and they are operated on battery power. The metering sites communicate with receivers via a wireless radio frequency communication link. If these receivers communicate with a large number of metering sites either directly or through relay devices known as repeaters, and also interface to a backhaul network, they are known as gateways. Gateways collect the data from a plurality of metering sites and pass the information via a wired or wireless network (local or wide area network), sometimes called a backhaul technology, to a central data collection system, where the data is processed for billing purposes. This backhaul network may include various public or private systems such as the WIFI (a wireless LAN), GPRS (a second generation cellular network), POE (Power over Internet), or CDMA (code division multiple access) or many others known in the art.

Cerny et al., U.S. Pat. No. 5,298,894, discloses an early example of a mobile automatic meter reading (AMR) system in which a utility meter transmitter transmits radio frequency (RF) metering data signals to an RF collection unit in a drive-by vehicle.

Gastouniotis et al., U.S. Pat. No. 4,940,976, discloses an early example of a fixed network for transmitting data from a plurality of utility meters to a central station through a plurality of fixed receiving stations. In fixed receiver network systems today, the receiver units can be mounted on utility poles, or on water storage tank towers, or inside of electric meters or in utility pedestals. In fixed network systems, it is not necessary to provide people and equipment to travel through the areas where readings are to be collected. Fixed meter reading networks are currently referred to in some literature in the technical field as Advanced Metering Infrastructure (AMI).

A fixed network system is currently preferred in many situations where a large amount of data from metering sites must be processed. On the other hand, there are sometimes periods when scheduled communications are not successful in such systems for various reasons.

Petite et al., Pat. Pub. No. US2005/0195775 discloses a fixed two-way network. Petite does not describe, however, that a gateway or transceiver is carried by a vehicle for collecting utility metering data along a geographical route. In Petite et al., there are two transmitters at each endpoint and two receivers that are each transmitting exclusively either in narrow band communication or in spread spectrum communication, depending on the detected single mode of communication used by the receivers. When a mode is selected for a transmitter, it is based on programmed sensing of the one mode of communication from the receivers using two-way communication.

Osterloh et al., U.S. Pat. Pub. No. US2005/0237959, FIG. 7, shows a method of switching an endpoint between a mobile network and a fixed network according to commands received by the endpoint from the mobile data collector and the fixed data collector, respectively. This is a receiver-command-driven method for a two-way network. This is an either-or selection of the fixed mode or mobile mode, and not a conditional mode of operation for a fixed network.

SUMMARY OF THE INVENTION

The invention provides a metering site transmitter/receiver, also known as a transceiver, with the ability to operate in a mobile back-up network to signal utility consumption data when a back-up condition is detected in a fixed network meter reading system. A mobile collection back-up capability allows a vehicle collection system to be used to read the meter data of the fixed network system, when a fixed network communications are not available.

Such non-availability can occur during initial installation and startup, or after installation and startup.

A method of the invention comprises a metering site transceiver receiving metering signals from a metering device that has been installed and has started up metering consumption of a utility. The metering site transceiver is responsive to the metering signals for transmitting a first plurality of radio frequency metering data signals in a condition for reception by a fixed network receiver within a reporting interval, such as every eight (8) hours within each 24-hour period. The metering site transceiver then checks for a back-up condition, and upon detection of the back-up condition, the metering site transceiver transmits a second plurality of radio frequency metering data signals in a condition for reception by a mobile receiver.

The invention also relates to a utility meter interface circuit for use in an automatic meter reading network, wherein the utility meter interface circuit is adapted for installation at a metering site, wherein the utility meter interface circuit is configured to transmit a first plurality of radio frequency signals during a reporting interval within each 24-hour period, wherein said first plurality of radio frequency signals are transmitted in a condition for reception by a fixed network receiver, the utility meter interface circuit also being configured to transmit a second plurality of radio frequency signals in a condition for reception by a mobile network receiver; and wherein the utility meter interface circuit is configured to check for a back-up condition, and upon occurrence of the back-up condition, the utility meter interface circuit repeatedly transmits the second plurality of radio frequency signals in a condition for reception by the mobile network receiver until a next scheduled attempt to transmit the first plurality of radio frequency signals to the fixed network receiver.

The invention is particularly applicable to sites associated with water meters and gas meters, where the metering sites also include transceivers that operate on battery power.

This invention allows data to be collected via a mobile radio receiver, but only when the data cannot be acquired via the fixed network. This allows the most efficient use of the battery associated with the site transceiver and the most efficient use of the RF channel between the site transceiver and the gateway.

In a further aspect of the invention, the circuitry further comprises a CPU operating according a stored control program. The control program is stored in a tangible, non-transitory medium, such as a semiconductor memory circuit, and includes a program routine that when executed, senses that the site transceiver has not communicated with the gateway for a defined time period. It then arranges for transmissions to a mobile network within another specified time period.

Other features of the invention, besides those discussed above, will be apparent to those of ordinary skill in the art from the description of the preferred embodiments which follows. In the description, reference is made to the accompanying drawings, which form a part hereof, and which illustrate examples of the invention. Such examples are illustrative, but for the scope of the invention, reference is made to the claims which follow the description.

DETAILED DESCRIPTION

Figure 1:
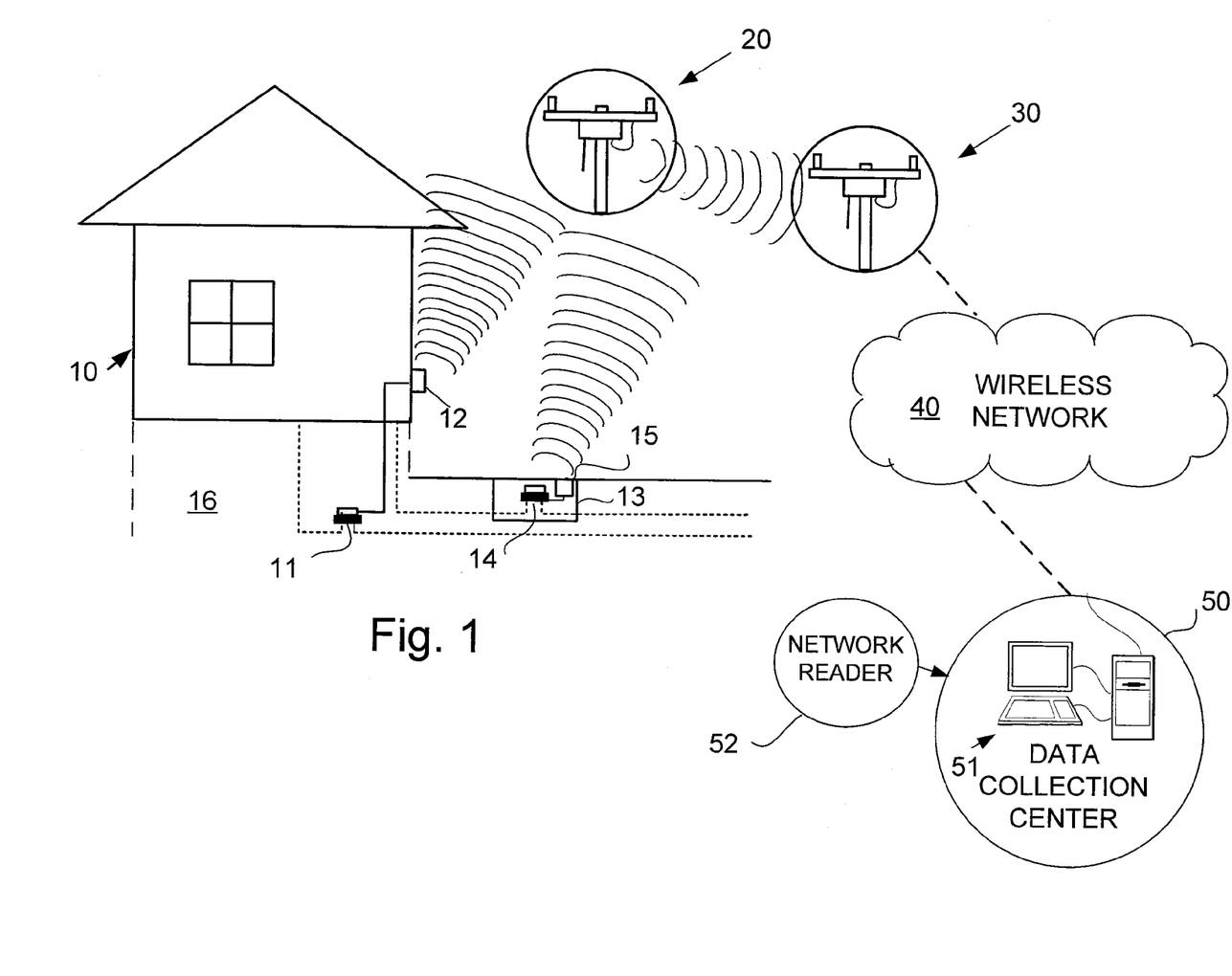
FIG. 1 is a schematic view of a meter reading system with a fixed receiver for receiving transmissions from a transmitter associated with a utility meter.

Referring to FIG. 1, a fixed automatic meter reading system includes a meter and meter register assembly 11 connected in a water line (shown schematically as a dashed line in FIG. 1) serving a residential building 10 through a basement 16 or a foundation crawl space. For buildings built on a concrete slab foundation, water line entry can be made through the slab or through a side wall. The assembly 11 includes a meter register for transmitting pulses to a transceiver assembly 12 mounted somewhere within or on the building 10. Alternatively, a meter and meter register assembly 14 can be connected in a water line (shown schematically as a dashed line in FIG. 1) and disposed in a subsurface pit enclosure 13 adjacent the building 10. The meter register in the assembly 14 includes a device for transmitting signals, representing units of utility consumption, to a transceiver assembly 15 mounted to a pit lid. Examples of meter registers with signal transmitters are disclosed in Cerny et al., U.S. Pat. No. 5,298,894 and Bloss Jr. et al., U.S. Pat. No. 5,825,303 and other known well known prior art.

The meter register in the assembly 11, 14 can be one that is commercially distributed by Badger Meter, Inc., the assignee of the present invention, under the trade designation "Recordall" Transmitter Register (RTR). Besides displaying units of consumption, this device uses a pulse transmitter that is described in Strobel et al., U.S. Pat. No. 4,868,566, entitled "Flexible Piezoelectric Switch Activated Metering Pulse Generators," to convert the mechanical movements of the meter to electrical signals. Other metering transducers known in the art, such as the absolute digital encoder (ADE) circuit offered by the assignee of the present invention can also be used as the meter register and these also produce electrical signals representing units of utility consumption. In addition, other magnetic sensing circuits are known in the art for converting movements of magnetic devices moved by a metering element, to electrical pulses representing units of metering consumption as described in Olson et al., U.S. Pat. No. 6,611,769.

Typically, the site transceiver assemblies 12, 15 are not connected to a source of AC or DC power and are operated on battery power. The site transceiver assemblies 12, 15 communicate with network transceiver assemblies 20, 30 via a wireless radio frequency communication link. The network is a fixed network, which is characterized by fixed network transceiver assemblies 30, as opposed to mobile transceivers carried in a vehicle or carried by a human employed to collect meter data. The transceiver assemblies 20, 30 can communicate with the site transceiver assemblies 12, 15, either directly, or through intermediate fixed transceiver assemblies 20 known as repeaters. The repeaters 20 receive messages from the site transceiver assemblies 12, 15 and relay the data in further radio frequency messages to the gateway transceiver assemblies 30. Or, the repeaters 20 can communicate in an opposite direction by receiving radio frequency messages from the gateway transceiver assemblies 30 and relaying the data content in further radio frequency messages to the site transceiver assemblies, 12, 15.

If these transceiver assemblies 30 communicate with a backhaul network, such as network 40, they are known as gateways (to the network). These transceiver units or gateways 30 can be mounted on utility poles, streetlight poles, or on other high structures such as buildings or water storage tank towers, or can be placed inside of electric meters or in utility pedestals. Gateways typically have a source of AC power, which can be converted to DC power for operating circuitry in the gateway. Gateways collect the data that is received from a plurality of transceivers 12, 15 at the utility meter data origination sites and pass the data via a second network, sometimes called a backhaul network to a central data collection system shown as a control center 50 in FIG. 1. In this example, the backhaul network is a wireless network 40. This wireless network 40 can include various public or private wireless systems operating according to at least one of the following protocols; WIFI (a wireless local area network connected to the Internet), GPRS (a second generation cellular network), POE (Power over Ethernet to the Internet) or CDMA (code division multiple access) and others known in the art.

The site transceiver assemblies 12, 15 transmit an electronic message that generally includes an identification code, current meter reading data, historical consumption data, status information, and an error code for checking the data at the receiving end. In addition, the site transceiver assemblies 12, 15 are described herein as transmitting special messages on installation and startup referred to as a "discovery" message and a "status" message. The meter data is eventually collected at the data collection center 50 for billing purposes. This data collection center 50 includes one or more computers 51 for communicating with the backhaul network 40 and processing the utility metering data into customer billing statements. The data collection center 50 also includes a network reader computer program 52, running on a computer 51 for managing communications with the meter data collection network. This computer program is further described in U.S. Pat. Pub. No. US2009/021678, entitled "Method and System for Providing a Self-Populating Database for the Network Collection of Meter Data" published Aug. 27, 2009 and assigned to the assignee herein.

Figure 2:
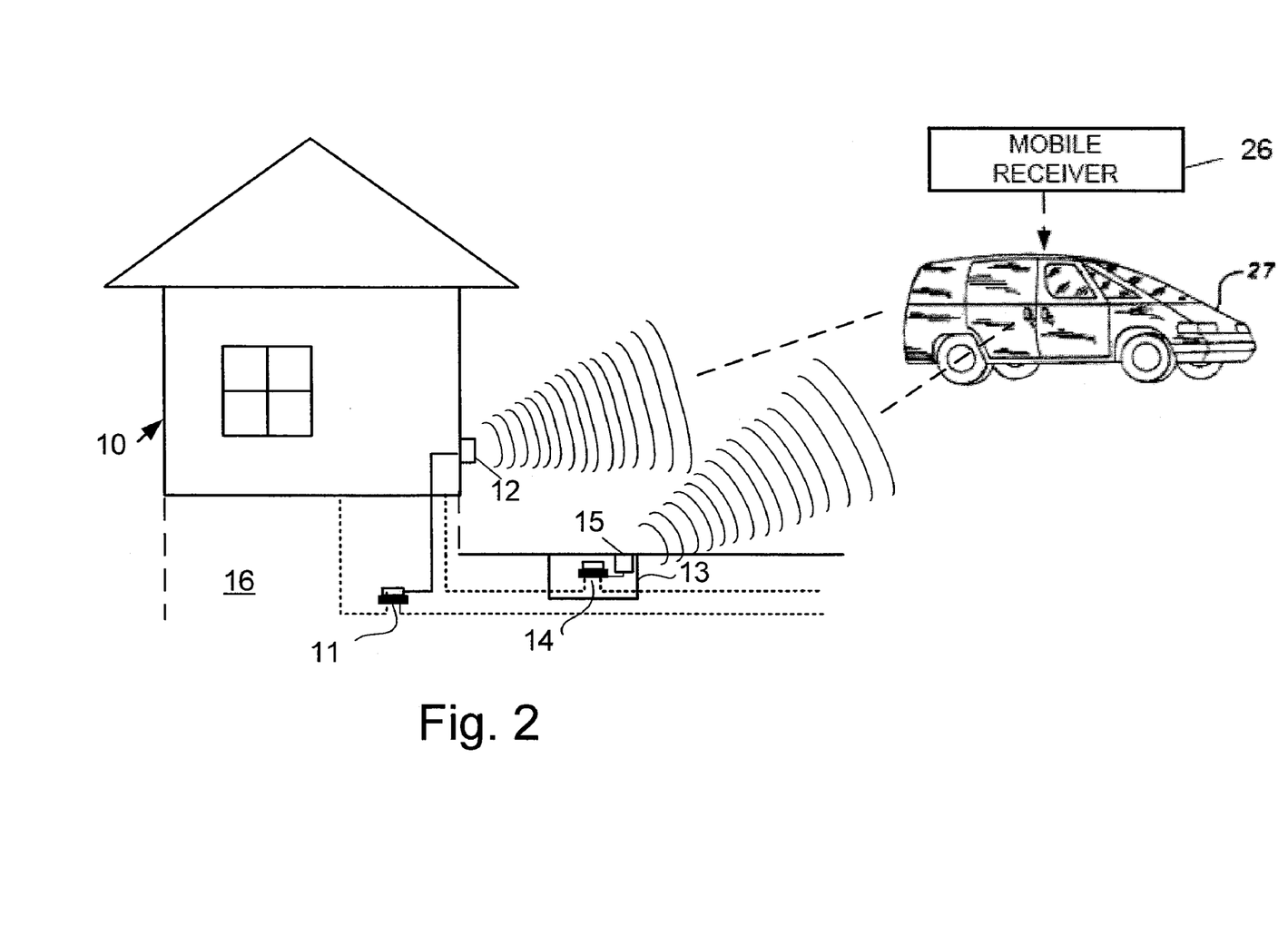
FIG. 2 is a schematic view of a meter reading system with a mobile receiver for receiving transmissions from a transmitter associated with a utility meter.

Referring to FIG. 2, under certain circumstances, described as a back-up condition, the site transceiver assemblies 12, 15 communicate with a mobile network receiver 26 carried by a vehicle 27. The vehicle 27 can be driven over a predetermined route or can be driven through a general area, such as a neighborhood, to receive meter reading data and transmitter identification data associated with the meter reading data. The site transceiver assemblies transmit signals in the mobile network on a relatively short repetitive interval rather than at the longer interval applicable to the fixed network.

Figure 3:
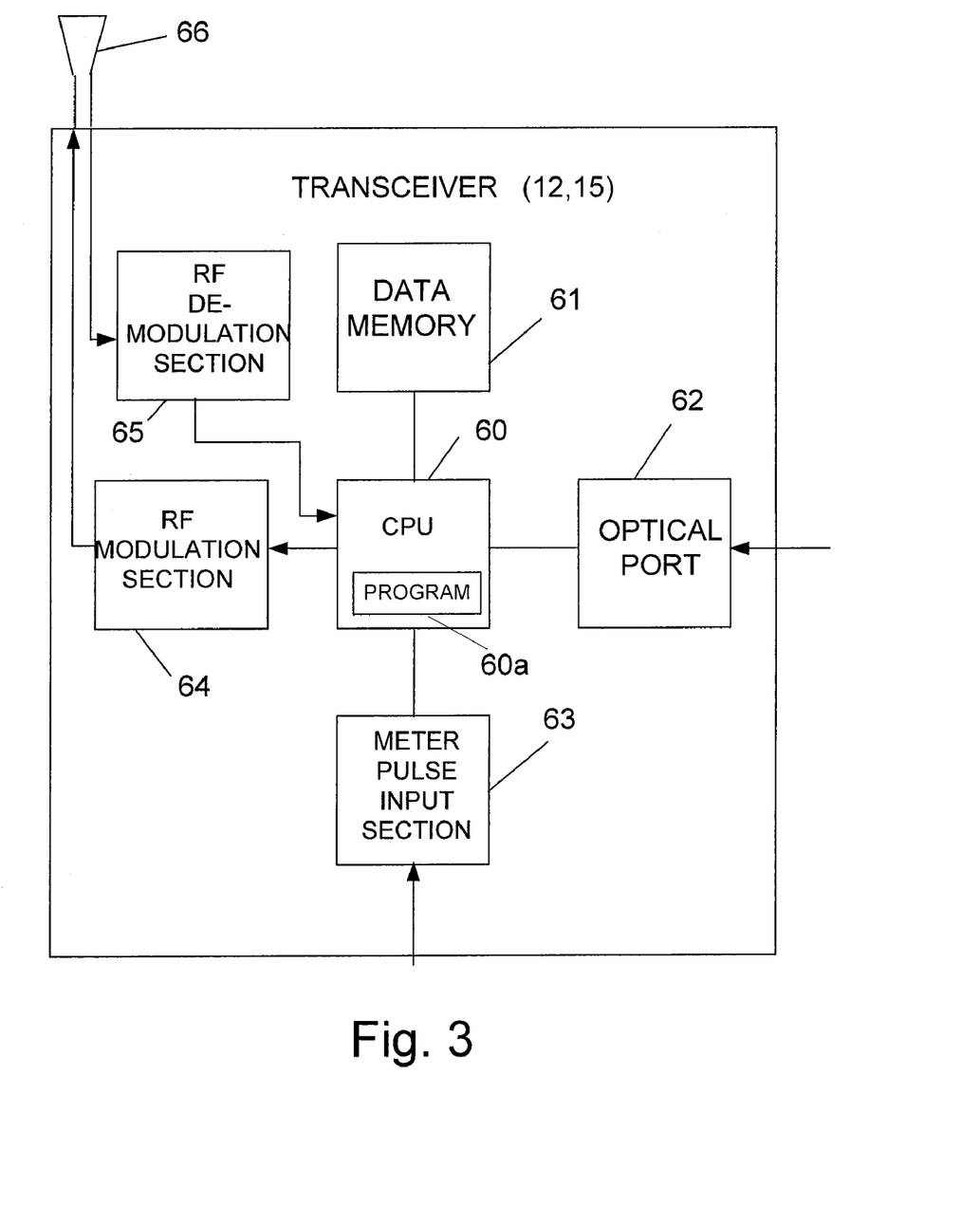
FIG. 3 is a block diagram of a metering site transmitter associated with a utility meter.

Referring to FIG. 3, the transceiver assembly 12, 15 more particularly includes an electrical circuit typically formed on a circuit board and including a microelectronic CPU 60 operating according to a control program stored in a program memory 60a. The program memory 60a is a tangible, non-transitory medium, in the form of a semiconductor circuit in this example. The program memory 60a is preferably non-volatile, but it can be receive data and commands from a special programming unit, which communicates with the transceiver through an optical I/O port 62. The CPU 60 typically also utilizes a memory 61 for data storage, and this may also be located on-board the CPU 60.

As further seen in FIG. 3, the CPU 60 receives pulses from a pulse encoder (not shown) through a meter pulse input section 63. This input section can receive a pulse input or an input from an absolute digital encoder (ADE) circuit of a type known in the art. The meter pulse input section transmits these signals in the form of metering signals to the CPU 60, which processes them as metering data. The CPU 60 then transmits metering data in a message protocol, which is converted to radio frequency (RF) signals by an RF modulation section 64. The radio signals are transmitted through an antenna 66 to a receiver 22 in the fixed network (FIG. 1), or under certain circumstances to a receiver 26 in the vehicle 27 (FIG. 2). Radio signals can also be received through antenna 66 from the receivers or gateways 30 and these signals are demodulated by a demodulation section 65 to extract data for processing by the CPU 60. This data can include commands and configuration data for operation of the transceiver assembly 12, 15.

The site transceiver assemblies 12, 15 each have two modes of operation, one mode for communicating with the receiver 20, 30 in the fixed network and another mode for communicating with the receiver 26 in the mobile network. Both the mobile transmissions and the fixed channel transmission will use the same fifty channels within the 902-928 MHz frequency band. The power level of operation is programmable in a range of from 1-30 dBm, which is applied to the antenna gain to determine the power level. The fixed network RF transmission from the transceivers will be near 18-20 dBm for gas and about 30 dBm for water metering applications. Mobile network transceiver transmissions are made at a power of 8 dBm or greater. The maximum power level of the transmission is limited by FCC regulations and to one (1) Watt maximum for frequency hopping spread spectrum (FHSS) communication with the fixed network receiver over fifty (50) channels.

The site transceiver 12 or 15 is powered by one or more on-board batteries (not shown). It should be understood that in single family residences only one of the two site transceivers 12 or 15 that are shown in FIGS. 1 and 2 would be utilized for a single utility such as water. In order to extend battery life, communication between a site transceiver assembly 12 or 15, and a gateway 30 is preferably initiated by the site transceiver assembly 12, 15. The site transceiver assembly 12, 15 is battery-powered while the gateway 30 is typically powered from an available AC source. As part of the network operation, each site transceiver assembly 12 or 15, has a respective identification number that is included in any communication to and from the assigned gateway 30. Due to the limitations on battery life and RF traffic of multiple endpoint transceivers and gateways, the site transceiver assembly 12 or 15 attempts to communicate with the assigned gateway only a few times per day and at least once per day.

All RF communication sequences between the site transceiver assembly 12 or 15, and the gateway 30 are initiated by the site transceiver assembly 12 or 15. The site transceiver assembly, 12 or 15, transmits a message on one or more of the fifty (50) radio communication channels having respective different frequencies. The site transceiver assembly 12, 15, then listens for a response on the same frequency communication channel that it sent the information. At a minimum, this response from the gateway 30 consists of an acknowledgment that the message was received. The gateway 30 can request that additional data be sent as part of this acknowledgement. If additional data are requested, the site transceiver assembly 12, 15 will transmit the data on the same frequency channel.

If the site transceiver assembly 12, 15 has received the acknowledgement and transmits the requested information, then the sequence is completed. If the site transceiver assembly 12, 15 does not receive an acknowledgement to a transmission of utility consumption data to an assigned gateway receiver 30, it will attempt to communicate with the gateway 30, through up to eight more attempts in short succession, as more particularly described in U.S. patent application Ser. No. 12/792,198, cited above, and this description is incorporated herein by reference. The number of these immediate retries is not essential to the present invention. The essential concept is that after a selected number of retries without an acknowledgement, the communication will be deemed unsuccessful with respect to reporting to the fixed network at that particular reporting interval.

Before a gateway receiver 30 is assigned, messages including a discover message and a status message are transmitted. The discover message includes the address "FFFFFFFF" which is a global address allowing reception by any gateway. If an acknowledgement to these messages is not received, there are no retries, until the transmission at the next reporting interval such as eight (8) hours.

Gateways 30 will only reply to RF messages from the site transceivers 12, 15 to which they have been assigned. However, the gateway receiver 30 will store the identification numbers for all site transceivers from which messages are received. There is also a passive mode which allows a gateway to store all the interval information from site transceivers 12, 15, even though it will not respond via radio frequency signals to the site transceivers 12, 15 if the gateway has not been assigned to them.

The default scheduled communication from the site transceiver 12 or 15 to the gateway 30 is every eight (8) hours in the preferred example. The data packet for the initial message includes eight interval readings beginning with the top of the hour (:00). If interval data is required at shorter intervals, then the RF communication rate will increase but the initial data packet still contains eight meter readings. For 15-minute intervals, eight readings can be provided to the gateway 30 at 2-hour intervals. For 5-minute data intervals, eight readings could be provided to the gateway every 40 minutes. The gateway has 9600 time slots available.

A condition of the activation of the back-up mode is that communication from the site transceiver 12 or 15 to the gateway 30 must have been unavailable for a period greater than twenty-four (24) hours, which period is selected here to be two days (48 hours). If a site transceiver 12 or 15 has not heard an acknowledgement signal from the gateway receiver 30 for at least two days prior to a scheduled mobile back-up period, the site transceiver 12 or 15, will transmit a mobile network message during a mobile network transmission interval. This message will be transmitted in a format for containing minimal data in comparison to a format of the normal fixed network message. This allows billing data, alarm data and metering data to be collected for the time period in which the gateway 30 is not in communication with the site transceiver 12 or 15.

A gateway 30 will store the received information but will only send an RF acknowledgement signal to the site transceiver 12, 15, if a message has been received from the computer 51 in the data collection center 50 via the backhaul network 40 in the previous two days (48 hours). This will force the site transceiver 12 or 15, into the mobile back-up transmission (at the scheduled time) if the gateway 30 is functioning, but the data cannot be forwarded to the data collection center 50. When network communication is re-established, the saved information can be retrieved from the gateway 30 by the data collection center 50.

Figure 4:
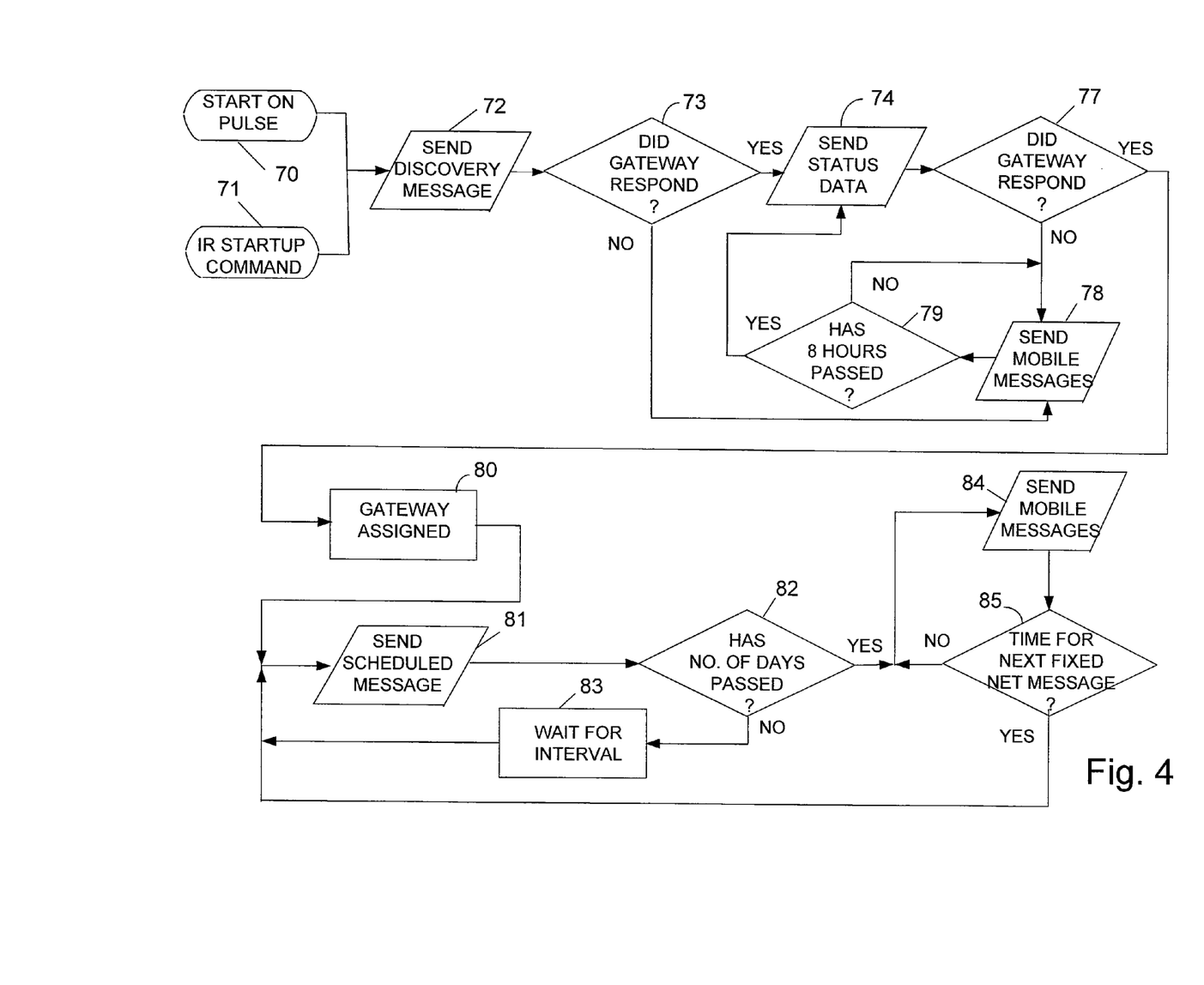
FIG. 4 is a flow chart of the operation of the metering site transmitter in switching communication between the receiver in FIG. 1 and the receiver in FIG. 2.

Referring to FIG. 4, a computer program routine is diagrammed. In this routine the blocks represent groups of instructions in a control program stored in the program memory 60a and executed by the CPU 60. As represented by start block 70, when a water meter assembly 11 or 14 is placed in the field, its transceiver 12 or 15 will start up upon receiving a pulse from its meter register as water begins to flow through the meter 11 or 14. For a gas meter and register assembly, operation would start by the input of a signal through optical IR interface 62 by a technician as represented by start block 71.

Once the site transceiver 12, 15 is started up, it will transmit a "discovery" message in a format to be received by any gateway receiver in the fixed network. A gateway address in the message is set to the global address, "FFFFFFFF." This message will be transmitted at the highest power level and this is represented by I/O block 72. The purpose of the "discovery" message is for the site transceiver 12, 15 to search for any gateways that can respond. If an acknowledgement is received from the gateway 30 as represented by the "Yes" result from decision block 73, then the site transceiver will send a status message at the communication interval, such as every eight (8) hours, until an assigned gateway responds, as represented by I/O block 74. If the discovery message does not result in a reply, as represented by the "No" result from decision block 73, then the CPU 60 proceeds to execute instructions represented by decision block 80 to send mobile network messages and then block 79 to determine if eight (8) hours has passed at which time it will attempt to transmit the status message as represented by I/O block 74. When an assigned gateway responds, as represented by the "Yes" result from decision block 77, the site transceiver 12, 15 will be in a fixed network mode where it is reporting on its scheduled reporting interval and it is not transmitting data for reception in the mobile network. Until an assigned gateway responds, as represented by the "No" result from decision block 77, the site transceiver 12 or 15 continues to send mobile network messages as represented by I/O block 78, and then a fixed network message with status data at the communication interval, such as every eight (8) hours, as represented by decision block 79 and I/O block 74.

Until a gateway is assigned, the site transceiver 12 or 15 will also transmit in mobile mode (every few seconds) while it is transmitting the discovery message every eight hours to obtain a reply from the assigned gateway. The site transceiver 12 or 15 can function in this type of operation for its entire service life. It will be transmitting mobile network data, while it is also searching to determine if a fixed network is installed.

When a gateway has been assigned, as represented by process block 80, the site transceiver 12 or 15 it will begin making transmissions of messages on a reporting schedule as represented by I/O block 81. This schedule is variable under the direction of the gateway receiver 30 and data collection center 50.

The site transceivers 12, 15 are assigned time slots to communicate to specific gateways 30 in specific programmed time slots. An individual gateway 30 has three (3) seconds between scheduled transmissions from various metering sites. The data collection center 50 will assign the time slots in 6-second intervals first. The schedule for adjacent gateways will be offset in time so the six gateways in closest proximity will be offset by one (1) second from each other.

Based on the three-second interval, a gateway will have 9600 available time slots in an 8-hour period for active listening. The 8-hour time slot is the most basic system RF reporting interval for the metering sites. More frequent reporting intervals will use a plurality of these time slots for each gateway. A site transceiver with a two-hour RF reporting interval will use four (4) of the 9600 slots, while a site transceiver with a 40-minute reporting interval will use twelve (12) of the 9600 time slots. There can also be 400 passive time slots added to the 9600 time slots just described, bringing the total number of time slots assigned to a gateway to ten thousand.

If communication is lost for a preset number of days, such as two days, as represented by the "Yes" result from decision block 82, the site transceiver 12 or 15 will initiate the mobile network transmissions, as represented by I/O block 84, while continuing to attempt to send the messages according to the last known schedule to the fixed network receiver 30 as represented by the "Yes" result from decision block 85. As long as the preset number of days has not passed, messages will be transmitted from a site transceiver according to the schedule for the fixed network, as represented by the "No" result from decision block 82, and this additional time is represented by the "Wait" process block 83. When communication is re-established with the gateway 30, as represented by an acknowledgement signal, then the mobile transmissions would again cease as represented by the loop through blocks 82 and 83.

This configuration allows the site transceivers 12, 15, to be installed for communication in a fixed or mobile network. The site transceiver 12, 15, will switch between fixed or mobile network transmissions without interaction from a user and without commands from the gateway 30 or data collection center 50.

The mobile network is a limited two-way network in which the site transceivers 12, 15 signal the receiver 26 in the vehicle 27, and in which is it is possible receive acknowledgement signals or commands from the mobile receiver 26. The fixed network is a limited two-way network in which some data is sent from the data collection computer 50 to the site transceivers 12, 15 in response to data sent from the site transceivers 12, 15 to data collection computer through the gateways 30.

One advantage of the invention is that it requires only a single transceiver per metering site per utility and provides both fixed and mobile modes of operation with common circuitry. Another advantage of the invention is that it conserves battery life.

Another advantage of the invention is that by selecting certain time periods, it maximizes communication and minimizes interference between communications.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A utility meter interface circuit for use in an automatic meter reading network, wherein the utility meter interface circuit is adapted for installation at a metering site, wherein the utility meter interface circuit is configured to transmit a first plurality of radio frequency signals during a reporting interval within each 24-hour period, wherein said first plurality of radio frequency signals are transmitted in a condition for reception by a fixed network receiver, and wherein the utility meter interface circuit is also configured to transmit a second plurality of radio frequency signals in a condition for reception by a mobile network receiver; the utility meter interface circuit comprising:
a CPU for executing instructions in a stored control program;
wherein the CPU is configured to control transmission and reception of radio frequency signals according to instructions in the stored control program; and the utility meter interface circuit further comprising;
a radio frequency modulation section for modulating meter data signals into RF signals for transmission; and
a radio frequency demodulation section for demodulating data from RF signals from device within a network; and
wherein the said utility meter interface circuit is configured to periodically check for a back-up condition, and upon occurrence of the back-up condition, the utility meter interface circuit repeatedly transmits the second plurality of radio frequency signals in a condition for reception by the mobile network receiver until a next reporting interval for transmitting the first plurality of radio frequency signals to the fixed network receiver.

2. The utility meter interface circuit as recited in claim 1, wherein during installation and startup of the utility meter interface circuit, the back-up condition consists essentially of not receiving an acknowledgement to the first plurality of radio frequency signals which are included in a discovery message to any fixed network receiver.

3. The utility meter interface circuit as recited in claim 1, wherein after an acknowledgement has been received during installation and startup, the back-up condition consists essentially of not receiving an acknowledgement at the utility meter interface circuit from the fixed network receiver for a preset number of days.

4. The utility meter interface circuit as recited in claim 3, wherein the preset number of days is two days.

5. The utility meter interface unit as recited in claim 1, wherein the first plurality of radio frequency signals are transmitted in a frequency hopping spread spectrum mode of communication in a frequency range from 902 MHz to 928 MHz and at a power level of at least 18 dBm.

6. The utility interface circuit as recited in claim 5, wherein the second plurality of radio frequency signals are transmitted at a frequency hopping spread spectrum mode of communication in a range from 902 MHz to 928 MHz and at a power level of at least 8 dBm.

7. The utility meter interface circuit as recited in claim 1, wherein the fixed network receiver is a gateway fixed receiver that communicates with a backhaul network, and wherein the back-up condition is detected by checking for an acknowledgement signal from the gateway fixed receiver in response to the first plurality of radio frequency signals, and if no acknowledgement signal has been received from the gateway fixed receiver within a specified period of time, the back-up condition is detected.

8. The utility interface circuit as recited claim 1, wherein said first plurality of radio frequency signals are transmitted in a message format defined for reception by the fixed receiver, and wherein the second plurality of radio frequency signals are transmitted in a message format defined for reception of metering data by the mobile receiver.

9. The utility meter interface circuit as recited in claim 8, wherein said transceiver circuit receives radio frequency signals from the fixed network receiver after transmitting radio frequency signals to the fixed network receiver, said radio frequency signals being received including commands for scheduling future transmissions of metering data from a transceiver circuit at the metering site.

10. The utility meter interface unit as recited in claim 1, wherein the first plurality of radio frequency signals and the second plurality of radio frequency signals are transmitted by common circuitry forming a single transmitter within the utility meter interface circuit.

11. A method of installation and operation of a metering site transceiver at a utility metering site for communication in a fixed meter reading network, and upon detection of certain conditions, for communication in a mobile meter reading network, the method comprising:
a metering site transceiver receiving metering signals from a metering device that has been installed and has started up metering consumption of a utility;
the metering site transceiver being responsive to the metering signals for transmitting a first plurality of radio frequency metering data signals in a condition for reception by a fixed network receiver within a reporting interval within each 24-hour period; and
the metering site transceiver then checking for a back-up condition, and upon detection of the back-up condition, the metering site transceiver transmitting a second plurality of radio frequency metering data signals in a condition for reception by a mobile receiver; and
wherein after an acknowledgment has been received during installation and startup the back-up condition consists essentially of not receiving a message at the metering site transceiver from the fixed network receiver for a present number of days.

12. The method as recited in claim 11, wherein during installation and startup of the metering site transceiver, the back-up condition consists essentially of not receiving an acknowledgement to at least one of a discovery message and a status message transmitted to a fixed network receiver responding to the discovery message.

13. The method as recited in claim 11, wherein the preset number of days is two days.

14. The method as recited in claim 11, wherein the first plurality of radio frequency signals are transmitted in a frequency hopping spread spectrum mode of communication in a frequency range from 902 MHz to 928 MHz and at a power level of at least 18 dBm.

15. The method as recited in claim 14, wherein the second plurality of radio frequency signals are transmitted at a frequency hopping spread spectrum mode of communication in a range from 902 MHz to 928 MHz and at a power level of at least 8 dBm.

16. The method as recited in claim 11, wherein the fixed receiver is a gateway fixed receiver that communicates with a backhaul network, and wherein the back-up condition is detected by checking for an acknowledgement signal from the gateway fixed receiver in response to the first plurality of radio frequency signals, and if no acknowledgement signal has been received from the gateway fixed receiver within a specified period of time, the back-up condition is detected.

17. The method as recited in claim 11, wherein said first plurality of radio frequency signals are transmitted in a format defined for reception by the fixed receiver, and wherein the second plurality of radio frequency signals are transmitted in a format defined for reception of metering data by the mobile receiver.

18. The method as recited in claim 17, wherein said metering site transceiver receives radio frequency signals from the fixed network receiver after transmitting radio frequency signals to the fixed network receiver, said radio frequency signals being received including commands for scheduling future transmissions of metering data from the metering site transceiver.

* * * * *